US006958867B2

United States Patent
Ohmori et al.

(10) Patent No.: US 6,958,867 B2
(45) Date of Patent: Oct. 25, 2005

(54) ILLUMINATION OPTICAL SYSTEM, EXPOSURE DEVICE USING THE ILLUMINATION OPTICAL SYSTEM, AND EXPOSURE METHOD

(75) Inventors: Toshihiko Ohmori, Kanagawa-ken (JP); Hiromi Ishikawa, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/674,055

(22) Filed: Sep. 30, 2003

(65) Prior Publication Data
US 2004/0223227 A1 Nov. 11, 2004

(30) Foreign Application Priority Data
Sep. 30, 2002 (JP) ........................ 2002-287630

(51) Int. Cl.[7] .............................. G02F 1/07; G02B 9/00
(52) U.S. Cl. ..................... 359/738; 359/242; 359/238; 359/290; 355/67
(58) Field of Search ................................ 359/738, 238, 359/242, 290, 291, 292; 355/67, 53, 71

(56) References Cited

U.S. PATENT DOCUMENTS

| 6,224,216 | B1 | * | 5/2001 | Parker et al. | .................. 353/31 |
| 6,784,961 | B2 | * | 8/2004 | Suzuki et al. | ................ 349/117 |
| 2004/0057034 | A1 | * | 3/2004 | Zinn et al. | ..................... 355/67 |

FOREIGN PATENT DOCUMENTS

JP          9-68667 A      3/1997

* cited by examiner

*Primary Examiner*—Timothy Thompson
(74) *Attorney, Agent, or Firm*—Sughrue Mion, PLLC (57) ABSTRACT

In an illumination optical system constituted to uniformize the intensity distribution of illumination light by use of an optical integrator, the overall length thereof is shortened. The illumination optical system includes: a light source including a laser irradiating illumination light on an illuminated body such as a two-dimensional SLM and an optical integrator; the optical integrator being placed between this light source and the illuminated body and uniformizes the intensity distribution of the illumination light by passing the light through minute cells. In this system, the size of the minute cell of the optical integrator (S1=S2) is 1.5 mm or less.

6 Claims, 6 Drawing Sheets

FIG.1A

DIAGONAL LENGTH OF LENS CELL AND
OVERALL LENGTH OF OPTICAL SYSTEM
ILLUMINATION NA : 0.019

FIG.1B

DIAGONAL LENGTH OF LENS CELL AND
OVERALL LENGTH OF OPTICAL SYSTEM
ILLUMINATION NA : 0.05

ILLUMINATION OPTICAL SYSTEM, EXPOSURE DEVICE USING THE ILLUMINATION OPTICAL SYSTEM, AND EXPOSURE METHOD

BACKGROUND OF THE INVENTION

1. Field of the Invention

The present invention relates to an illumination optical system, particularly in detail to an illumination optical system which passes illumination light emitted from a laser through an optical integrator and uniformizes its intensity distribution.

Moreover, the present invention relates to an exposure method and device which exposes a photosensitive material by irradiating illumination light, modulated after being emitted from an illumination optical system as described above, onto the photosensitive material.

2. Description of the Related Art

Exposure devices designed to illuminate a two-dimensional spatial light modulator, such as a liquid crystal display (LCD) and a digital micromirror device (DMD), with light from a light source and light modulated by this spatial light modulator to expose photosensitive material, are known. Devices of this type are required to illuminate the spatial light modulator uniformly. Thus, an optical integrator is incorporated in an illumination optical system. As described above, the optical integrator which uniformizes the intensity distribution of illumination light is generally used in projectors and the like besides the exposure device.

The optical integrator is one which resolves and uniformizes a correlation (intensity distribution) between intensities and positions by dividing luminous flux and combining the luminous flux again after having passed through different paths. The optical integrator is classified broadly into two types, depending on differences in methods for dividing the luminous flux. One is a fly-eye type which divides a luminous flux spatially by use of a lens array (fly-eye lens) in which a plurality of lenses are placed two-dimensionally. The other is a rod type which performs angular division of a luminous flux by multipath reflection by using a glass rod or a hollow rod with a mirrored inner surface. Note that the lens shape of the fly-eye type optical integrator and the shape of the cross-section in the rod-type optical integrator are made similar to the shape of a spatial light modulator to be illuminated. Thus, even if the shape of the light source and the shape of the spatial light modulator are different from each other, efficient illumination is possible.

Japanese Unexamined Patent Publication No. 9 (1997)-68667 discloses an example of an illumination optical system using an optical integrator as described above.

Note that, in an optical device such as a projector to which the illumination optical system using the foregoing optical integrator is applied, conventionally, a fly-eye lens with an aspect ratio of approximately 4:5 and a lens cell size of approximately 5 to 10 mm is used.

In the conventional illumination optical system using the foregoing optical integrator, a light source having a large Etendue (to be described later), such as a discharge lamp, had been used. Therefore, when illumination efficiency was sought to be improved, it was necessary to increase a numerical aperture NA (hereinafter, referred to as "illumination NA") on the side of an object to be illuminated. In the case that the conventional illumination optical system was applied to an exposure device in which, unlike a magnifying projecting device, photosensitive materials were exposed by light magnified at a 1:1 magnification ratio or less, the focal depth was too small, thereby deteriorating image quality. On the other hand, in the case that the illumination NA was decreased to increase the focal depth, the overall length of the optical system tends to be long. Thus, a problem has been recognized that an exposure device and the like to which this illumination optical system is applied has inevitably grown in size, and that physical layout of such a device is difficult.

SUMMARY OF THE INVENTION

In consideration of the foregoing circumstances, the object of the present invention is to provide an illumination optical system using an optical integrator, which is capable of shortening the overall length thereof.

Moreover, the object of the present invention is to provide an exposure method and an exposure device which can be miniaturized by applying an illumination optical system as described above.

The illumination optical system according to the present invention includes: alight source which irradiates illumination light to a spatial light modulator such as the above-described DMD or the like; and an optical integrator which is disposed between this light source and the spatial light modulator and uniformizes the intensity distribution of the illumination light by passing the light through optical elements. In this illumination optical system, the diagonal lengths of the optical elements of the optical integrator are 4 mm or less.

Here, the diagonal length of the optical element is the diagonal length of each lens cell in a fly-eye-type optical integrator. Meanwhile, similarly, the diagonal length of the optical element is the diagonal length of a rod cross-section in a rod-type optical integrator.

Note that, in the illumination optical system of the present invention having the foregoing constitution, Etendue of the light source is preferably 1 $mm^2 \cdot str$ (steradian) or less. Moreover, in the illumination optical system of the present invention, as the light source, one which performs optical multiplexing of a plurality of lasers by making the lasers incident on an optical fiber and further arranges a plurality of the optical fibers to form a bundle can be favorably used. That is, this type of light source realizes extremely high output while having a small Etendue. Therefore, it is preferably used in the illumination optical system of the present invention.

Meanwhile, the exposure device according to the present invention has a composition which modulates the illumination light emitted from the above-described illumination optical system by use of the spatial light modulator based on a predetermined image signal and exposes a photosensitive material with an image formed by this modulated illumination light.

In addition, the exposure method according to the present invention modulates the illumination light emitted from the above-described illumination optical system by use of the spatial light modulator based on a predetermined image signal and exposes a photosensitive material with an image formed by this modulated illumination light.

Figure 1A:
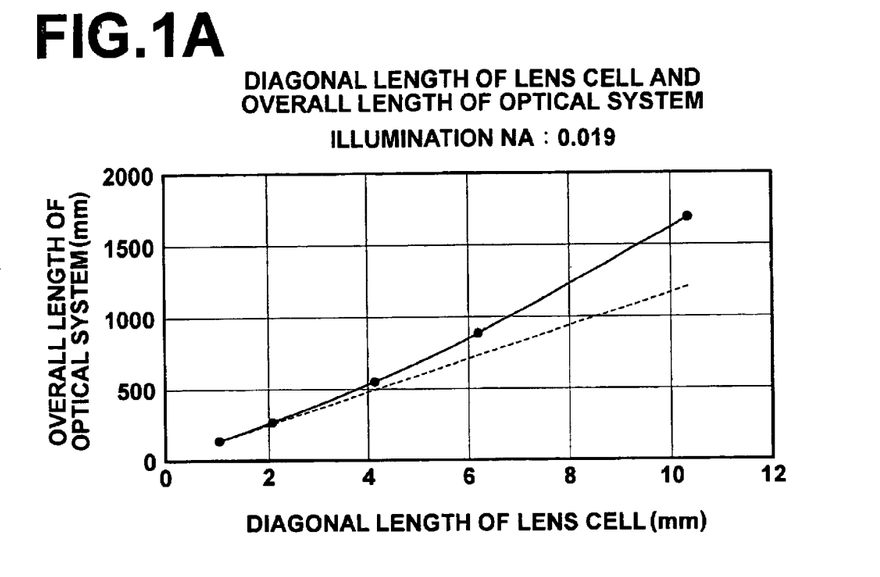
FIG. 1A is a graph showing the relationship between the diagonal length of a lens cell of an optical integrator in an illumination optical system and the overall length of the optical system, in the case that an illumination NA is 0.019.
Figure 1B:
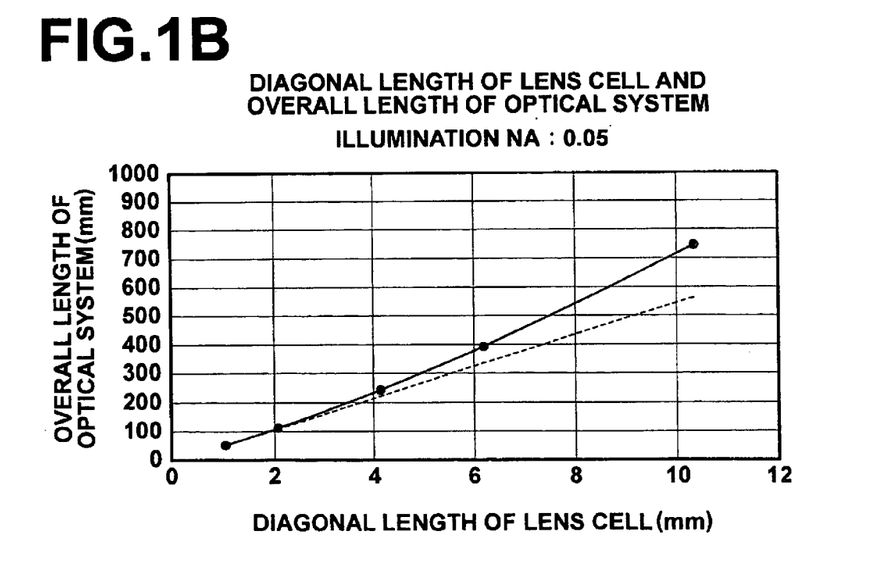
FIG. 1B is a graph showing the relationship between the diagonal length of a lens cell of an optical integrator in an illumination optical system and the overall length of the optical system, in the case that an illumination NA is 0.05.
Figure 4:
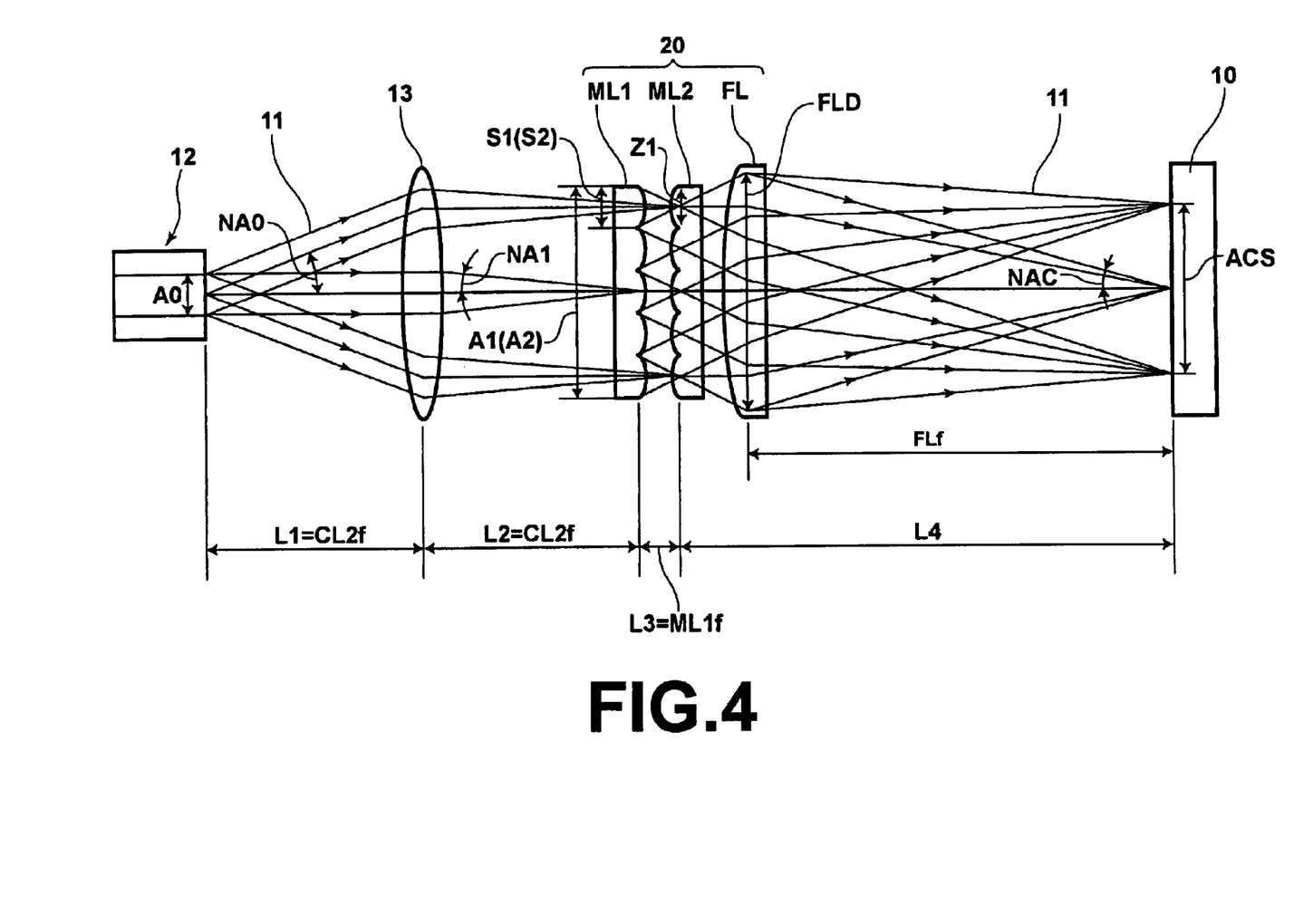
FIG. 4 is a schematic side view showing an illumination optical system according to one embodiment of the present invention.

FIGS. 1A and 1B show relationships between diagonal lengths of lens cells in an illumination optical system using a fly-eye type optical integrator, of which the basic constitution is shown in FIG. 4 to be described later, and the overall length of the optical system, for cases in which the illumination NA is 0.019 and 0.05, respectively. As shown in these graphs, when the diagonal length of the lens cell exceeds 4 mm, the overall length of the optical system tends to get longer sharply. In the illumination optical system of the present invention, in consideration of this new knowledge, diagonal lengths of optical elements of the optical integrator is set to 4 mm or less. Thus, the overall length of the optical system can be significantly suppressed.

Although the illumination optical system using the fly-eye type optical integrator is described above, a similar relationship is exhibited between the diagonal length of the cross section of a rod of the optical integrator and the overall length of the optical system, in an illumination optical system using the above-described rod-type optical integrator.

Moreover, in the illumination optical system of the present invention, if, in a particular case where the Etendue of the light source is set small, for example, to 1 mm²·str or less, a numerical aperture NA at the illuminated side (hereinafter referred to as illumination NA) can be reduced without a decrease in illumination efficiency. Thus, the focal depth of the optical system set at the further side of the illuminated body can be enlarged, and the laser beam can be narrowed. In this case, problems, such as the exposed image formed by the imaging optical system set at the further side of the illuminated body becoming out of focus can be prevented, for example, when the illumination optical system is applied to the exposure device.

The relationship between this Etendue and illumination NA will be described in detail. In the exposure device as described above or projectors, discharge lamps such as super-high pressure mercury lamps are often used as the light source. However, in the case of using such lamps, particularly in exposure devices which expose photosensitive material, there is a problem that the focal depth is extremely small. The problem of small focal depth becomes apparent from the viewpoint of the concept of Etendue.

Figure 2:
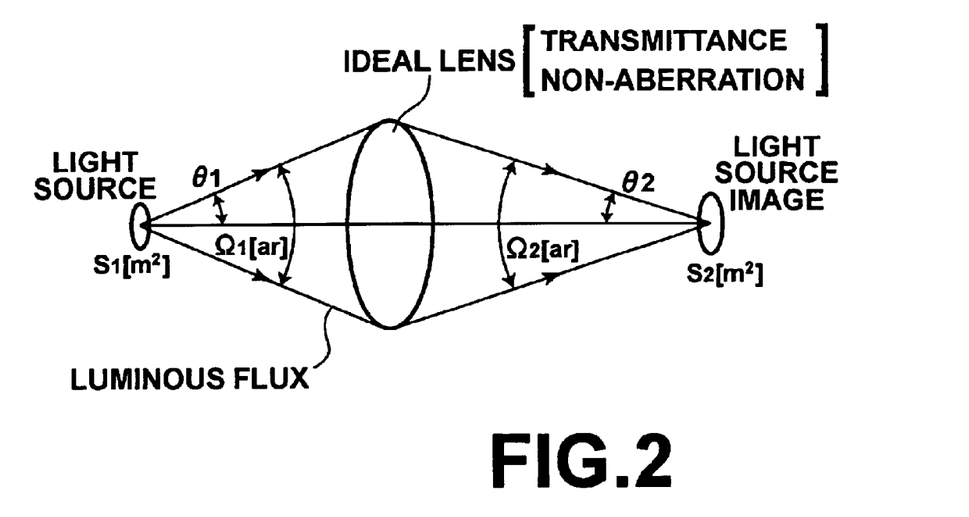
FIG. 2 is an explanatory view illustrating the concept of Etendue.

First, the details of Etendue will be explained with reference to FIG. 2. To illuminate the spatial light modulator, broadly speaking (even if uniform distribution is devised), is to form a certain light source image onto the spatial light modulator. Here, when it is assumed that the area of the light source is $S_1$ and the optical scale factor $\beta$, as shown in FIG. 2, the area $S_2$ of the image is in proportional to $\beta^2$ ($S_2=\beta^2 S_1$) and the angle $\theta$ made by light beam and the optical axis is inversely proportional to the scale factor $\beta$ ($\theta_2=\theta_1/\beta$). Therefore, $S_1\theta_1^2=S_2\theta_2^2$ is obtained. Here, the solid angle $\Omega$ is approximately proportional to $\theta^2$ and thus $\Omega_1 \cdot S_1 \leq \Omega_2 \cdot S_2$ is obtained. In other words, the product of the light source area and the solid angle is constant.

In a strict sense, transmission of the luminous flux by an ideal lens is expressed by the following equation.

luminous flux: $e=\int S \int \Omega \cos \theta \cdot dS \cdot d\Omega$

When $\theta$ is sufficiently small (F value of 2.5 or more), $\cos \theta \leq 1$. Thus, the following equation is obtained.

luminous flux: $e=\Omega_1 \cdot S_1 \leq \Omega_2 \cdot S_2$

This $\Omega \cdot S$ is the Etendue. Assuming an ideal optical system of non-aberration/transmittance of 100%, the Etendue is preserved. Note that, even if the optical systems at both sides sandwiching the ideal lens therebetween are not in a conjugate relationship, the Etendue is known to be preserved. In other words, Etendue at the light source side represents a spatial spread of the luminous flux emitted from the light source, and Etendue at the illuminated side (the spatial light modulator side) represents a spatial spread of the luminous flux that can be received.

Here, calculation examples are shown.

<Etendue Es at the Light Source Side>

(1) In the Case of a Discharge Lamp having an Arc Length of 4 mm

Assuming that the light source is cylindrical with a diameter of 1 mm and a length of 4 mm and that light is isotropically emitted from the side surface thereof, the following equation is obtained.

$Es=\pi \cdot 1 \cdot 4 \cdot 2\pi \approx 80$ mm²·str (steradian)

(2) In the Case of a Fiber Light Source

As an example, considered is a light source in which a plurality of optical fibers propagating lasers are arranged to form a bundle. Assuming that the size of an exit portion of the bundle is 0.7×0.7 mm and the numerical aperture NA of the optical fiber is 0.2 ($\approx$11.5 deg), the following equation is obtained.

$Es=2\pi \cdot (1-\cos 11.5) \cdot 0.7 \cdot 0.7 \approx 0.06$ mm²·str

In this case, the Etendue is extremely small.

<Light Incident Angle (Illumination NA) at the Spatial Light Modulator Side, which is Obtained from Etendue Ec at the Spatial Light Modulator Side and the Foregoing Light Source Side Etendue Es>

As an example, calculations are performed for the case where the number of pixels of the spatial light modulator is 1024×768 and the pixel pitch 13.68 μm with no loss.

(1) In the Case of the Foregoing Discharge Lamp $Es=Ec=2\pi \cdot (1-\cos \theta) \cdot 1024 \cdot 768 \cdot 13.68^2/1000^2 = 80$ mm²·str illumination $NA=\sin \theta \approx 0.4$ (2) In the Case of the Foregoing Fiber Light Source $Es=Ec=2\pi \cdot (1-\cos \theta) \cdot 1024 \cdot 768 \cdot 13.68^2/1000^2 = 0.06$ mm²·str illumination $NA=\sin \theta \approx 0.01$ As is clear from above, the smaller the light source side Etendue Es, the smaller the illumination NA.

Moreover, from the viewpoint of Etendue, when Etendue Es at the light source side and Etendue Ec at the illuminated spatial light modulator side has the relationship of Es<Ec, with no loss in the optical system therebetween, the light from the light source can be fully utilized. However, in the case of using the lamp as described above as the light source, due to large Etendue of the lamp, the illumination NA must be made extremely large for efficient illumination.

For example, as described above, in the case of illuminating the spatial light modulator having 1024×768 pixels and the pixel pitch of 13.68 μm by use of a discharge lamp having an arc length of 4 mm, the Etendue of the discharge lamp is about 80 mm²·str. Accordingly, in order to perform efficient illumination by making the Etendue of the spatial light modulator the same as that of the discharge lamp, the illumination NA must be set to 0.4. In order to form an image of the spatial light modulator on a photosensitive material by use of an imaging lens to expose the photosensitive material, and to efficiently use the light from the spatial light modulator, it is reasonably required to set the NA of the imaging lens to 0.4 or more (1.25 by F value). Therefore, the focal depth of the imaging lens becomes extremely small.

Figure 3A:
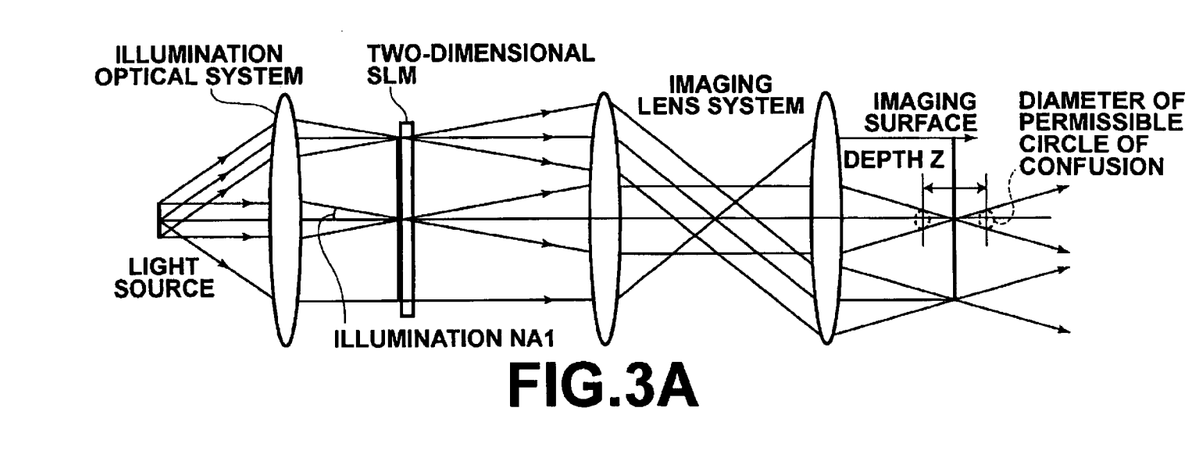
FIGS. 3(a) and 3(b) are explanatory views, showing the relationship between illumination NA and focal depth in the illumination optical system.
Figure 3B:
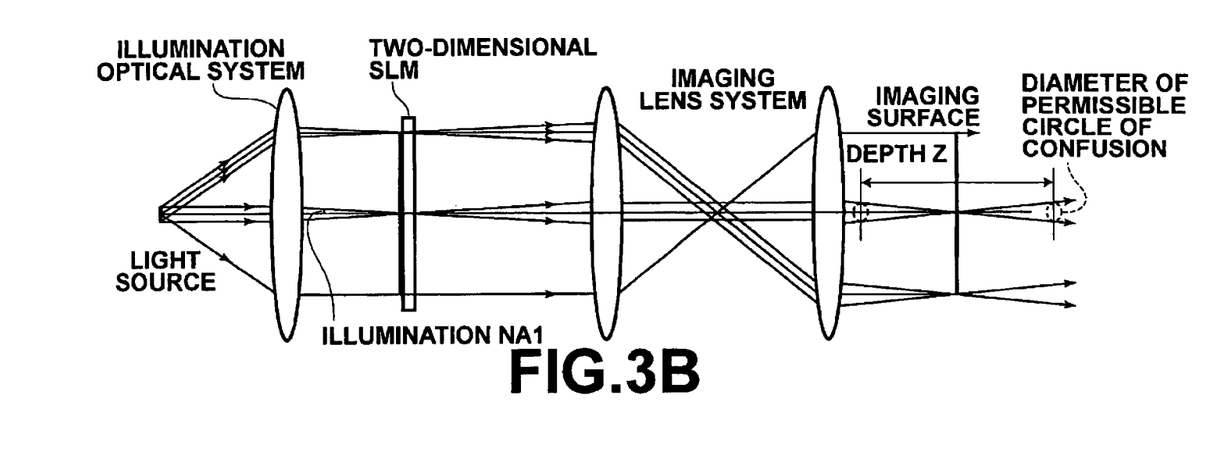

FIG. 3 shows the focal depth of the image lens by comparing (a) the case where the light source side Etendue Es is relatively large and the illumination NA is also large, to (b) the case where the light source side Etendue Es is relatively small and the illumination NA is also small. As shown in the drawings, in general geometrical optics, the smaller the NA of the lens, the larger the focal depth.

For example, if the diameter of an allowable circle of confusion is 10 μm, the focal depth corresponding to the illumination NA will be as those shown in Table 1, below. The focal depth in the case that the illumination optical system is applied to the exposure device depends on a recording beam diameter, a degree of resolution, and the like. However, taking into consideration warp of a recording material and focal position change due to temperature, it is desirable that the focal depth is ±100 μm or greater. Based on this point, it is also desirable that the illumination NA is 0.05 or less, and more preferably, 0.02 or less.

In the case of a large light source side Etendue Es, when temperature fluctuations and mechanical shifts occur in the device or when there is a variation in the thickness of the photosensitive material or curvatures, there arises a problem that an exposed image becomes out of focus due to the extremely small focal depth.

On the other hand, in the case of using, the foregoing fiber light source, the light source side Etendue Es is 0.06 $mm^2 \cdot str$, and the illumination NA becomes extremely small, approximately 0.01, and the focal depth of the imaging lens becomes large. Thus, the foregoing problem of focusing can be prevented.

Note that, even in the case of using the light source having small Etendue Es as described above, when a fly-eye lens which is used in a projector and the like with a general lens cell size is applied, the size of the entire optical system grows because the size of each lens is too large to reduce the illumination NA. Consequently, the present invention uses an optical integrator having optical elements having diagonal lengths of 4 mm or less as described above.

DESCRIPTION OF THE PREFERRED EMBODIMENTS

With reference to the drawings, embodiments of the present invention will be described below.

FIG. 4 shows a schematic constitution of an illumination optical system according to one embodiment of the present invention. This illumination optical system includes: a light source 12 which irradiates illumination light 11 onto a two-dimensional spatial light modulator (SLM) 10 which is an illuminated body; a collimator lens 13 which converts the illumination light 11 emitted in a state of diverging rays from this light source 12 into parallel rays; and an optical integrator 20 which is placed between this collimator lens 13 and the two-dimensional SLM 10 and uniformizes the intensity distribution of the illumination light 11 by passing the light through optical elements.

In this embodiment, as the foregoing light source 12, a fiber light source is used which performs multiplexing of a plurality of lasers by making a plurality of lasers incident to an optical fiber and further arranges a plurality of these optical fibers to form a bundle.

The optical integrator 20 comprises: a fly-eye lens ML1; another fly-eye lens ML2 which is placed in a state of facing this fly-eye lens ML1; and a field lens FL which is placed in front of this fly-eye lens ML2, that is, on the two-dimensional SLM 10 side. In the fly-eye lenses ML1 and ML2, a great number of minute lens cells are placed vertically and horizontally. The illumination light 11 which has passed through the respective minute lens cells is made incident onto the two-dimensional SLM 10 while overlapping with each other. Thus the intensity distribution of the illumination light 11 illuminating the two-dimensional SLM 10 is uniformized.

Meanwhile, as the two-dimensional SLM 10, a digital micromirror device (DMD) is used in this embodiment. In this DMD, a number of micromirrors are placed two-dimensionally on a semiconductor substrate made of silicon and the like. Specifically, each of the micromirrors has a reflecting surface of which the angle changes in accordance with a control signal. The spreading illumination light 11 irradiated on the DMD is reflected while changing the angle of each micromirror in accordance with image data. Thus, the illumination light 11 is spatially modulated.

Here, the a light source size, that is, the size of a light emitting portion of the fiber light source 12 is designated as A0, the light source NA as NA0 and a focal length of the collimator lens 13 as CL2f. As for the fly-eye lens ML1, the cell size is designated as S1, the number of lens cells as N1, the lens size as A1, the focal length as ML1f and the conversion size of each lens cell as Z1. As for the fly-eye lens ML2, the cell size is designated as S2, the number of lens cells as N2, the lens size as A2 and the focal length as ML2f. Moreover, the lens size of the field lens FL is designated as FLD and the focal length thereof as FLf, and the illumination size of the two-dimensional SLM 10 as ACS and the illumination NA thereof as NAC. Note that, in this embodiment, it is assumed that S2=S1, N2=N1 and A2=A1. However, needless to say, there is no limitation in this regard.

Moreover, in this case, the overall length of the optical system, that is, the length from the emission end surface of the multimode optical fiber 12 to the two-dimensional SLM 10 is, as shown in FIG. 4, the sum of length L1 (=CL2f) from the foregoing emission end surface to the collimator lens 13, length L2 (=CL2f) from the collimator lens 13 to the fly-eye lens ML1, length L3 (=ML1f) from the fly-eye lens ML1 to the fly-eye lens ML2 and length L4 from the fly-eye lens ML2 to the two-dimensional SLM 10.

Moreover, in this illumination optical system, A0·NA0= A1·NA1=N1·S1·NA1, the imaging characteristic is (1/L3)+

(1/L4)=1/ML2f, the scale factor characteristic is ACS/S1= L4/L3, the converging characteristic is Z1=2ML1f·NA1 and the illumination F value (FNo.) is FNo.=FLf/FLD≈L4/A2.

As to the above-described respective specifications and other specifications, concrete numerical values in this embodiment are collectively shown in the left hand column of table 2 below. In addition, numerical values of three comparative examples are shown in Table 3. Note that x and y in these tables indicate horizontal and vertical directions within a plane perpendicular to the optical axis, respectively.
[Table 2]
[Table 3]

As shown in Table 2, in this embodiment, the diagonal lengths of each lens cell of the fly-eye lenses ML1 and ML2 included in the optical integrator is $(2^2+0.5^2)^{1/2}=2.1$ mm, which is less than the above-described value of 4 mm. Thus, for the reason previously described with reference to FIG. 1, the optical system overall length is suppressed to be as short as approximately 114 mm.

In addition, numerical values of a different configuration of an illumination optical system having the same basic structure as that of the present embodiment is shown in the right hand column of Table 2. In this example, the diagonal lengths of the rod cross sections of the fly-eye lenses ML1 and ML2 are both $(3.88^2+0.97^2)=^{1/2}=4.0$ mm, which is less than or equal to the above described value of 4 mm. Thus, in this example as well, the overall length of the optical system si suppressed to be as short as approximately 524 mm.

On the other hand, in the comparative examples shown in Table 3, the foregoing diagonal lengths of each lens cell is as large as $(10^2+2.5^2)^{1/2}=10.3$ mm, and thus the optical system overall lengths are relatively large being approximately 289 mm, 744 mm, and 1711 mm, respectively.

Moreover, in this embodiment, the light source Etendue is as small as 0.0086895 $mm^2$·str, which is less than 1 $mm^2$·str. Thus, the illumination NA (NAC) assumes extremely small values of 0.05 and 0.0185071, respectively. Accordingly, in the case of placing the imaging lens behind the two-dimensional SLM 10, the focal depth of the imaging lens is increased and thus the problem of focusing as described above can be prevented.

On the other hand, in the comparative example shown in the leftmost column of Table 3, the light source Etendue is as large as 1.5868265 $mm^2$·str. Thus, the illumination NA (NAC) becomes a considerably large value of 0.25. Accordingly, in the case of placing the imaging lens behind the two-dimensional SLM 10, the focal depth of the imaging lens is reduced and thus the above-described problem of focusing is likely to occur.

Moreover, in the comparative examples shown in the center and rightmost columns of Table 3, the light source Etendue is 0.0086895 $mm^2$·str, which is the same as that of the present embodiment. Thus, the values of the illumination NA (NAC) become extremely small, 0.05 and 0.0186359, respectively. Accordingly, also in these cases, the foregoing problem of focusing can be prevented. However, as described above, in these comparative examples, because of the large cell size, the optical system overall length becomes extremely large, approximately 744 mm and 1711 mm. Due to such a long optical system overall length of the latter comparative example, it becomes difficult even to set the illumination optical system in an ordinary room.

Figure 5:
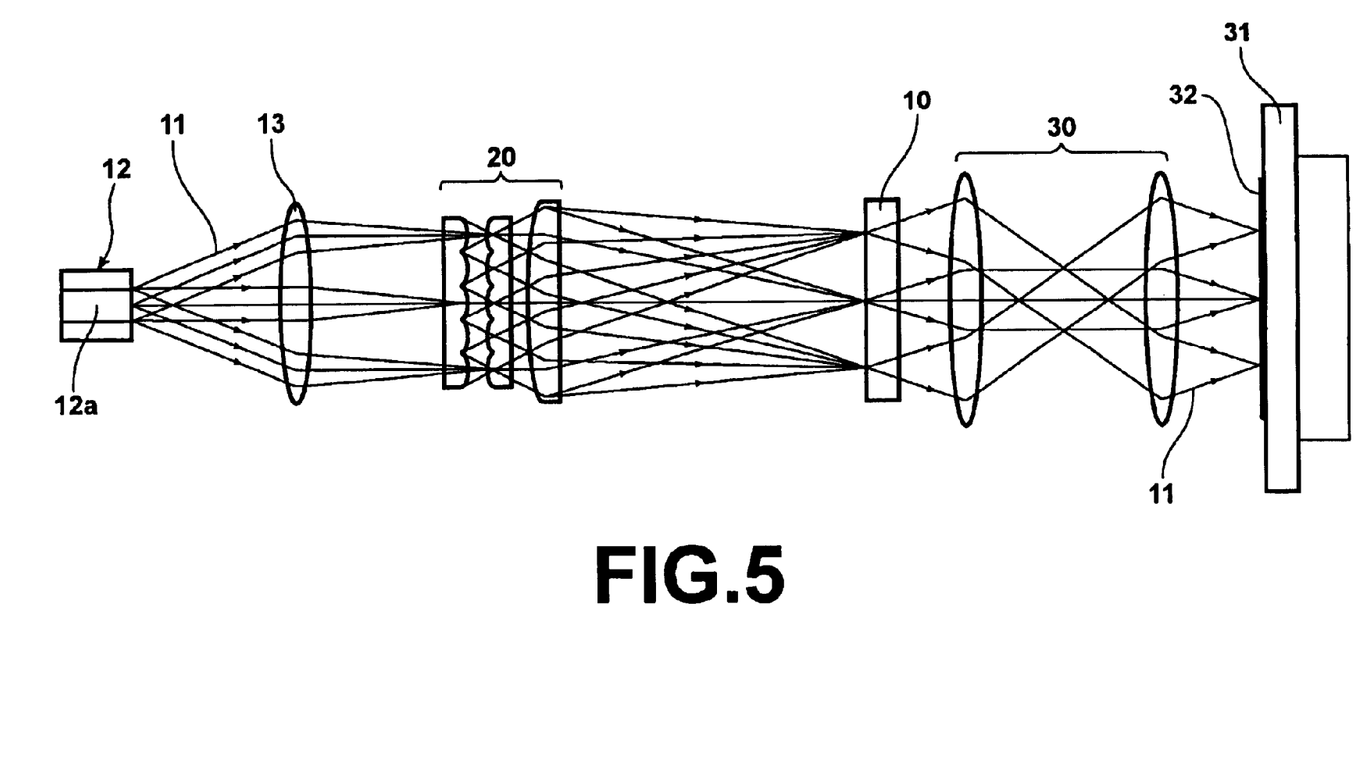
FIG. 5 is a schematic side view showing an exposure device to which the illumination optical system of FIG. 4 is applied.

Next, with reference to FIG. 5, an exposure device using the illumination optical system of FIG. 4 will be described. Note that, in FIG. 5, the constituent components equivalent to those in FIG. 4 are denoted by the same reference numbers and descriptions thereof will be omitted unless particularly required (the same applies to descriptions given hereinafter).

In this exposure device, an imaging lens 30 is placed behind the two-dimensional SLM 10 of the illumination optical system shown in FIG. 4. By use of this imaging lens 30, an image is formed by the illumination light 11 spatially modulated by the two-dimensional SLM 10 and projected onto a photosensitive material 32 on stage 31. Thus, the photosensitive material 32 is exposed and the image formed by the spatially modulated illumination light 11 is inscribed on the photosensitive material 32.

When the illumination optical system of FIG. 4 is applied to such an exposure device, a small-size exposure device can be manufactured because of a short overall length of the illumination optical system. Moreover, because of a small illumination NA (NAC), the focal depth of the imaging lens 30 is increased. Thus, the exposed image can be efficiently prevented from being out of focus.

Figure 6:
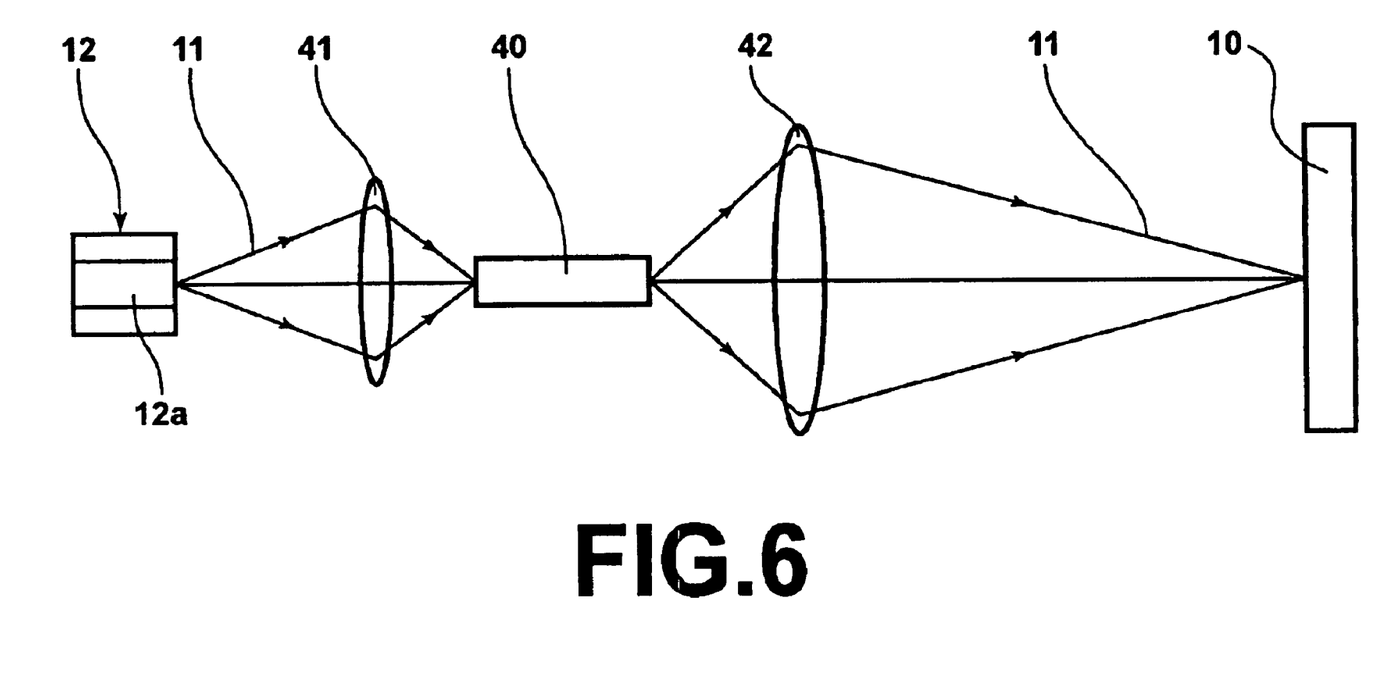
FIG. 6 is a schematic side view showing an illumination optical system according to another embodiment of the present invention.

Next, with reference to FIG. 6, an illumination optical system according to another embodiment of the present invention will be described. In this embodiment, a light transmissive glass rod 40 having a substantially parallelepiped shape is used as an optical integrator. The illumination light 11 emitted from the multimode optical fiber 12 which constitutes the light source is converged by a condenser lens 41 and led into this glass rod 40. Inside the glass rod 40, the light undergoes angular division by multiplex reflection, thus uniformizing the intensity distribution thereof, and then emitted. In such a manner, the illumination light 11 emitted from the glass rod 40 is converged by the condenser lens 42 and irradiated onto the two-dimensional SLM 10.

Also in this embodiment using the foregoing glass rod 40 as the optical integrator, the diagonal length of the cross section of this glass rod 40 is previously set to 4 mm or less and thus the overall length of the optical system can be significantly suppressed.

Note that, in the above-described embodiments, the fiber light source 12 is used as the light source. However, the present invention, is not limited to such light source, and other lasers can be also preferably used, including, for example, a single regular semiconductor laser, a multicavity semiconductor laser having a plurality of luminous points, or an array laser including a plurality of semiconductor lasers arranged in arrays and the like.

TABLE 1

| ILLUMINATION NA: 0.5 | → | FOCAL DEPTH: ±10 μm |
| ILLUMINATION NA: 0.1 | → | FOCAL DEPTH: ±50 μm |
| ILLUMINATION NA: 0.05 | → | FOCAL DEPTH: ±100 μm |
| ILLUMINATION NA: 0.02 | → | FOCAL DEPTH: ±250 μm |

TABLE 2

| | | | LIGHT SOURCE ETENDUE: SMALL COMMON FLY-EYE LENS | | LIGHT SOURCE ETENDUE: SMALL COMMON FLY-EYE LENS | |
|---|---|---|---|---|---|---|
| DIRECTION | | | x | y | x | y |
| SLM | TYPE | | 0.7 inch XGA | | 0.7 inch XGA | |
| | PIXEL PITCH | μm | 13.8 | | 13.8 | |
| | PIXEL SIZE | μm | 13 | | 13 | |
| | NUMBER OF PIXELS USED | μm | 1024 | 256 | 1024 | 256 |
| | USED AREA SIZE | pix | 14.1312 | 3.5328 | 14.1312 | 3.5328 |
| | ILLUMINATION AREA SIZE | mm | 16 | 4 | 16 | 4 |
| LIGHT SOURCE | LIGHT SOURCE SIZE | mm | 0.37 | 0.37 | 0.37 | 0.37 |
| | LIGHT SOURCE NA | | 0.2 | 0.2 | 0.2 | 0.2 |
| | ETENDUE | mm$^2$·str | 0.0086895 | 0.0086895 | 0.0086895 | 0.0086895 |
| | LC LOCAL DISTANCE | mm | 17.5 | 17.5 | 33.95 | 33.95 |
| OPTICAL SYSTEM | LENS-DMD INTERVAL | mm | 70 | 70 | 367 | 367 |
| | ML1 NUMBER OF DIVISONS | | 49 | | 49 | |
| | ML1 NUMBER OF CELLS | mm | 3.5 | 14 | 3.5 | 14 |
| | ML1 CELL SIZE | mm | 2 | 0.5 | 3.88 | 0.97 |
| | ML1 FOCAL DISTANCE | mm | 8.75 | 8.75 | 88.9975 | 88.9975 |
| | ML1 SIZE | mm | 7 | 7 | 13.58 | 13.58 |
| | NA1 | | 0.0105714 | 0.0105714 | 0.0054492 | 0.0054492 |
| | ML2 FOCAL DISTANCE | mm | 7.7777778 | 7.7777778 | 71.627767 | 71.627767 |
| | ML2 NUMBER OF CELLS | | 3.5 | 14 | 3.5 | 14 |
| | ML2 CELL SIZE | mm | 2 | 0.5 | 3.88 | 0.97 |
| | SIZE OF LIGHT CONDENSED BY ML1 | mm | 0.185 | 0.185 | 0.9699286 | 0.9699286 |
| | OPTICAL MAGNIFICATION RATE | | 8 | 8 | 4.1237113 | 4.1237113 |
| | ILLUMINATION NAC | | 0.05 | 0.05 | 0.0185014 | 0.0185014 |
| | ILLUMINATION FNo. | | 10 | 10 | 27.025037 | 27.025037 |
| | OVERALL LENGTH(LIGHT SOURCE-DMD) | mm | 113.75 | 113.75 | 523.8975 | 523.8975 |

TABLE 3

| | | | LIGHT SOURCE ETENDUE: SMALL COMMON FLY-EYE LENS | | LIGHT SOURCE ETENDUE: SMALL COMMON FLY-EYE LENS | | LIGHT SOURCE ETENDUE: SMALL COMMON FLY-EYE LENS | |
|---|---|---|---|---|---|---|---|---|
| DIRECTION | | | x | y | x | y | x | y |
| SLM | TYPE | | 0.7 inch XGA | | 0.7 inch XGA | | 0.7 inch XGA | |
| | PIXEL PITCH | μm | 13.8 | | 13.8 | | 13.8 | |
| | PIXEL SIZE | μm | 13 | | 13 | | 13 | |
| | NUMBER OF PIXELS USED | μm | 1024 | 256 | 1024 | 256 | 1024 | 256 |
| | USED AREA SIZE | pix | 14.1312 | 3.5328 | 14.1312 | 3.5328 | 14.1312 | 3.5328 |
| | ILLUMINATION AREA SIZE | mm | 16 | 4 | 16 | 4 | 16 | 4 |
| LIGHT SOURCE | LIGHT SOURCE SIZE | mm | 5 | 5 | 0.37 | 0.37 | 0.37 | 0.37 |
| | LIGHT SOURCE NA | | 0.2 | 0.2 | 0.2 | 0.2 | 0.2 | 0.2 |
| | ETENDUE | mm$^2$·str | 1.5868265 | 1.5868265 | 0.0086895 | 0.0086895 | 0.0086895 | 0.0086895 |
| | LC LOCAL DISTANCE | mm | 87.5 | 87.5 | 87.5 | 87.5 | 87.5 | 87.5 |
| OPTICAL SYSTEM | LENS-DMD INTERVAL | mm | 70 | 70 | 350 | 350 | 945 | 945 |
| | ML1 NUMBER OF DIVISONS | | 49 | | 49 | | 49 | |
| | ML1 NUMBER OF CELLS | mm | 3.5 | 14 | 3.5 | 14 | 3.5 | 14 |
| | ML1 CELL SIZE | mm | 10 | 2.5 | 10 | 2.5 | 10 | 2.5 |
| | ML1 FOCAL DISTANCE | mm | 43.75 | 43.75 | 218.75 | 218.75 | 590.625 | 590.625 |
| | ML1 SIZE | mm | 35 | 35 | 35 | 35 | 35 | 35 |
| | NA1 | | 0.0285714 | 0.0285714 | 0.0021143 | 0.0021143 | 0.0021143 | 0.0021143 |
| | ML2 FOCAL DISTANCE | mm | 26.923077 | 26.923077 | 134.61538 | 134.61538 | 363.46154 | 363.46154 |
| | ML2 NUMBER OF CELLS | | 3.5 | 14 | 3.5 | 14 | 3.5 | 14 |
| | ML2 CELL SIZE | mm | 10 | 2.5 | 10 | 2.5 | 10 | 10 |
| | SIZE OF LIGHT CONDENSED BY ML1 | mm | 2.5 | 2.5 | 0.925 | 0.925 | 2.4975 | 2.4975 |
| | OPTICAL MAGNIFICATION RATE | | 1.6 | 1.6 | 1.6 | 1.6 | 1.6 | 1.6 |
| | ILLUMINATION NAC | | 0.25 | 0.25 | 0.05 | 0.05 | 0.0185185 | 0.0185185 |
| | ILLUMINATION FNo. | | 2 | 2 | 10 | 10 | 27 | 27 |
| | OVERALL LENGTH (LIGHT SOURCE-DMD) | mm | 228.75 | 228.75 | 743.75 | 743.75 | 1710.625 | 1710.625 |

What is claimed is:

1. An exposure device, comprising:
   a spatial light modulator; and
   an illumination optical system, comprising:
      a light source which irradiates illumination light on the spatial light modulator, the light source comprising a laser and an optical fiber for propagating laser light emitted from the laser therethrough, and for emitting the laser light; and
      an optical integrator which is placed between the light source and the spatial light modulator and uniformizes an intensity distribution of the illumination light by passing light through optical elements,
      wherein diagonal lengths of the optical elements of the optical integrator are 4 mm or less; and
   wherein illumination light emitted from the illumination optical system is modulated by the spatial light modulator based on a predetermined image signal and exposure of a photosensitive material is performed with an image formed by this modulated illumination light.

2. An exposure device comprising:
   a spatial light modulator; and
   an illumination optical system, comprising:
      a light source which irradiates illumination light on the spatial light modulator, wherein the light source has a constitution in which multiplexing of a plurality of lasers is performed by making the lasers incident on one optical fiber and a plurality of the optical fibers are further arranged to form a bundle, and
      an optical integrator which is placed between the light source and the spatial light modulator and uniformizes an intensity distribution of the illumination light by passing light through optical elements,
      wherein diagonal lengths of the optical elements of the optical integrator are 4 mm or less; and
   wherein illumination light emitted from the illumination optical system is modulated by the spatial light modulator based on a predetermined image signal and exposure of a photosensitive material is performed with an image formed by this modulated illumination light.

3. An exposure device comprising:
   a digital micromirror device (DMD); and
   an illumination optical system, comprising:
      a light source which irradiates illumination light on the DMD, the light source comprising a laser and an optical fiber for propagating laser light emitted from the laser therethrough, and for emitting the laser light; and
      an optical integrator which is placed between the light source and the DMD and uniformizes an intensity distribution of the illumination light by passing light through optical elements,
      wherein diagonal lengths of the optical elements of the optical integrator are 4 mm or less; and
   wherein illumination light emitted from the illumination optical system is modulated by the DMD based on a predetermined image signal and exposure of a photosensitive material is performed with an image formed by this modulated illumination light.

4. An exposure device
   a digital micromirror device (DMD); and
   an illumination optical system, comprising:
      a light source which irradiates illumination light on the DMD, wherein the light source has a constitution in which multiplexing of a plurality of lasers is performed by making the lasers incident on one optical fiber and a plurality of the optical fibers are further arranged to form a bundle, and
      an optical integrator which is placed between the light source and the DMD and uniformizes an intensity distribution of the illumination light by passing light through optical elements,
      wherein diagonal lengths of the optical elements of the optical integrator are 4 mm or less; and
   wherein illumination light emitted from the illumination optical system is modulated by the DMD based on a predetermined image signal and exposure of a photosensitive material is performed with an image formed by this modulated illumination light.

5. An exposure method comprising the steps of:
   providing an illumination optical system, comprising:
      a light source which irradiates illumination light on a spatial light modulator, the light source comprising a laser and an optical fiber for propagating laser light emitted from the laser therethrough, and for emitting the laser light; and
      an optical integrator which is placed between the light source and the spatial light modulator and uniformizes an intensity distribution of the illumination light by passing light through optical elements,
      wherein diagonal lengths of the optical elements of the optical integrator are 4 mm or less; and
   modulating illumination light emitted by the illumination optical system with the spatial light modulator based on a predetermined image signal; and
   exposing a photosensitive material with an image formed by this modulated illumination light.

6. An exposure method comprising the steps of:
   providing an illumination optical system, comprising:
      a light source which irradiates illumination light on the spatial light modulator, wherein the light source has a constitution in which multiplexing of a plurality of lasers is performed by making the lasers incident on one optical fiber and a plurality of the optical fibers are further arranged to form a bundle, and
      an optical integrator which is placed between the light source and the spatial light modulator and uniformizes an intensity distribution of the illumination light by passing light through optical elements,
      wherein diagonal lengths of the optical elements of the optical integrator are 4 mm or less; and
   modulating illumination light emitted by the illumination optical system with the spatial light modulator based on a predetermined image signal; and
   exposing a photosensitive material with an image formed by this modulated illumination light.

* * * * *